United States Patent
Lumsden

(10) Patent No.: US 10,927,022 B2
(45) Date of Patent: Feb. 23, 2021

(54) PROCESS FOR TREATING MINE DRAINAGE

(71) Applicant: Montgomery Chemicals LLC, Conshohocken, PA (US)

(72) Inventor: Charles A. Lumsden, Buckhead, GA (US)

(73) Assignee: MONTGOMERY CHEMICALS LLC, Conshohocken, PA (US)

( * ) Notice: Subject to any disclaimer, the term of this patent is extended or adjusted under 35 U.S.C. 154(b) by 37 days.

(21) Appl. No.: 16/252,360

(22) Filed: Jan. 18, 2019

(65) Prior Publication Data

US 2019/0218120 A1 Jul. 18, 2019

Related U.S. Application Data

(60) Provisional application No. 62/618,860, filed on Jan. 18, 2018.

(51) Int. Cl.
| | | |
|---|---|---|
| C02F 1/00 | (2006.01) | |
| C02F 1/52 | (2006.01) | |
| C02F 1/66 | (2006.01) | |
| C02F 103/10 | (2006.01) | |
| C02F 101/20 | (2006.01) | |

(52) U.S. Cl.
CPC .......... C02F 1/5245 (2013.01); C02F 1/5236 (2013.01); C02F 1/66 (2013.01); C02F 2001/007 (2013.01); C02F 2101/20 (2013.01); C02F 2101/203 (2013.01); C02F 2101/206 (2013.01); C02F 2103/10 (2013.01); C02F 2209/06 (2013.01); C02F 2209/40 (2013.01); C02F 2301/024 (2013.01); C02F 2301/08 (2013.01)

(58) Field of Classification Search
CPC ..... C02F 1/66; C02F 2103/10; C02F 2301/08
See application file for complete search history.

(56) References Cited

U.S. PATENT DOCUMENTS

| | | |
|---|---|---|
| 2,937,143 A | 5/1960 | Goren |
| 4,138,539 A | 2/1979 | Landolt et al. |
| 4,289,540 A | 9/1981 | Yong et al. |
| 5,286,806 A | 2/1994 | Neff et al. |
| 5,505,857 A | 4/1996 | Misra et al. |
| 5,530,069 A | 6/1996 | Neff et al. |
| 5,645,730 A | 7/1997 | Malachosky et al. |
| 5,879,564 A | 3/1999 | Farinato |
| 5,945,494 A | 8/1999 | Neff et al. |
| 6,667,374 B2 | 12/2003 | Hernandez-Barajas et al. |
| 6,866,689 B2 | 3/2005 | Lumsden et al. |
| 7,033,507 B2 | 4/2006 | Zhuang |
| 7,674,526 B2 | 3/2010 | Feitz et al. |

(Continued)

FOREIGN PATENT DOCUMENTS

WO 2007047481 A2 4/2007

OTHER PUBLICATIONS

D.B. Johnson, "Acid Mind Drainage Remediation Options: A Review," Science of the Total Environment 338 (2005), 3-14.

Primary Examiner — Bradley R Spies
(74) Attorney, Agent, or Firm — Paul & Paul

(57) ABSTRACT

Aqueous acid mine drainage is aerated and treated with slaked lime to reduce ferrous iron as a sludge. Further treatment with an alkaline sodium borohydride solution reduces residual iron and manganese which precipitates out and is removed.

18 Claims, 2 Drawing Sheets

(56) References Cited

U.S. PATENT DOCUMENTS

| | | | |
|---|---|---|---|
| 2003/0132166 A1* | 7/2003 | Rey | C02F 9/00 |
| | | | 210/696 |
| 2011/0147306 A1 | 6/2011 | Polizzotti et al. | |
| 2014/0166583 A1* | 6/2014 | Clements | C02F 1/5236 |
| | | | 210/695 |
| 2017/0274431 A1* | 9/2017 | Van Heerden | B09C 1/10 |

* cited by examiner

PROCESS FOR TREATING MINE DRAINAGE

CROSS REFERENCE TO RELATED APPLICATION

This application claims the benefit of the priority of U.S. Provisional Application No. 62/618,860, filed Jan. 18, 2018, which is incorporated by reference herein in its entirety.

BACKGROUND OF THE INVENTION

1. Field of the Invention

The present invention relates to the treatment of mine drainage to reduce heavy metal ions and other contaminents.

2. Brief Description of the Prior Art

Acid mine drainage ("AMD") is considered to be one of the worst environmental problems associated with mining activity. AMD from abandoned mines is a long-term threat to the environment and directly impacts it by polluting streams, rivers, groundwater and drinking water. It disrupts wildlife habitat and destroys the natural landscape. Such waters typically pose an additional risk to the environment by the fact that they often contain elevated concentrations of metals (iron, aluminum and manganese, and possibly other heavy metals). As metal ion laden water enters waterways it is exposed to air and the metal ions begin to oxidize. When this occurs, the oxygen in the waterways is consumed, making the water uninhabitable for aquatic life. Moreover, the rust and heavy metals in the water make it unusable to wildlife that depends on that water source for survival. Therefore, impact of acid mine drainage is a major concern for environmental agencies around the world.

The method of AMD treatment depends on the type and concentrations of the metal cations in the water. One treatment possibility of acid mine water is chemical precipitation, which is associated with the increase of AMD pH. Increasing the pH of contaminated water to a desired value promotes metal precipitation in the form of hydroxides.

Although many different biological and chemical technologies exist for treatment of AMD, lime neutralization remains by far a widely applied treatment method. This is largely due to the high efficiency in removal of dissolved heavy metals combined with the fact that lime costs are low in comparison to alternatives. Lime treatment essentially consists of bringing the pH of the raw water to a point where the metals of concern are insoluble. These metals therefore precipitate to form minuscule particles. Separation of these precipitates is then required to produce a clear effluent which meets discharge criteria. This technology is cost effective, easy to control pH and can be applied to large operating units. However, large volumes of possibly hazardous concentrated sludge are generated requiring further treatment and controlled final disposal.

SUMMARY OF THE INVENTION

The present invention provides a process for treating acid mine drainage. The process includes a metal ion reduction step, in addition to a metal hydroxide precipitation step. The present process provides significant advantages over prior art quick lime treatment processes. The present invention provides additional benefits. The present process employs a treatment agent which is readily soluble in AMD. Further, the present process is easy to apply to large volumes of AMD. Importantly, the present process produces significantly less sludge than prior art processes.

Preferably, the mine drainage is tested to determine the concentration of iron and/or manganese present in order to determine an effective amount of alkaline sodium borohydride solution to be added to precipitate the ferrous and/or manganese ions out of the mine drainage.

In one embodiment, this present invention provides a process for treating acid mine drainage. In this embodiment the process comprises providing raw aqueous acid mine drainage having an acidic pH, and preferably, aerating the raw acid mine drainage to raise the pH and permit solid particles precipitated in the acid mine drainage to settle out of the acid mine discharge. Further, in this embodiment the process preferably includes slowing the flow of the aerated acid mine drainage, preferably for a fixed period, to permit the precipitated particles in the acid mine drainage to settle out of and separate from the acid mine drainage as a sludge and thus to obtain a treated acid mine drainage. In addition, in this embodiment, the process preferably includes separating the treated acid mine drainage from the sludge to provide separated acid mine drainage. In this embodiment, the process also preferably includes slowing the flow of the separated acid mine drainage. In this embodiment, the process also preferably includes adding slaked lime to the stored, separated acid mine drainage to further raise the pH of the separated acid mine drainage and to permit the precipitated particles in the separated acid mine drainage to settle out of and separate from the separated acid mine drainage as a sludge and to form further treated acid mine drainage. Further, in this embodiment, the process also preferably includes separating the further treated acid mine drainage from the sludge to provide further separated acid mine drainage. In this embodiment, the process also preferably includes slowing the flow of the further separated acid mine drainage. In addition, in this embodiment, the process also preferably includes adding an alkaline aqueous solution of an alkali metal borohydride to the stored, further separated acid mine drainage to further raise the pH of the further separated acid mine drainage and to permit the precipitated particles in the further separated acid mine drainage to settle out of and separate from the separated acid mine drainage as a sludge and to form finally treated acid mine drainage. Further, in this embodiment, the process also preferably includes separating the finally treated acid mine drainage from the sludge to form finally separated acid mine drainage.

Preferably, the process further comprises aerating the separated acid mine drainage. Preferably, the process further comprises aerating the further separated acid mine drainage.

Preferably, the alkali metal borohydride is sodium borohydride. Preferably, the alkali metal borohydride is added at a ratio of from about 0.5 ppm to about 2.0 ppm of alkali metal borohydride to the further separated acid mine drainage. More preferably, the alkali metal borohydride is added at a ratio of from about 1 ppm to about 1.5 ppm.

In this embodiment, the process also preferably includes further discharging the finally separated acid mine drainage to a surface water stream.

In this embodiment, the process also preferably includes slaking calcium oxide to prepare slaked lime.

In this embodiment, the process also preferably includes creating a turbulent flow in the acid mine drainage to aerate the acid mine drainage.

In one aspect of this embodiment, the process also preferably includes slowing the flow of the aerated acid mine drainage in a first pond, slowing the flow of the separated acid mine drainage in a second pond, and slowing the flow of the further separated acid mine drainage in a third pond.

In another aspect of this embodiment, the process also preferably includes slowing the flow of the aerated acid mine drainage in a first settling tank, slowing the flow of the separated acid mine drainage in a second settling tank, and slowing the flow of the further separated acid mine drainage in a third settling tank.

Preferably, in this embodiment the alkali metal borohydride is added to the further separated alkali mine drainage in an amount effective to reduce the total amount of sludge produced in the process by at least 10 percent by weight. More preferably, in this embodiment the alkali metal borohydride is added to the further separated alkali mine drainage in an amount effective to reduce the total amount of sludge produced in the process by at least 20 percent by weight.

Preferably, in this embodiment, the process also preferably includes transferring sludge generated in any of the process steps to a sludge densification tank.

In another presently preferred embodiment, the present invention provides a process for treating neutral mine drainage. In this embodiment, the process comprises providing raw aqueous neutral mine drainage having a neutral pH (e.g. between 6.5 and 7.5) and preferably aerating the neutral acid mine drainage to provide precitiated solid particles suspended in the neutral mine drainage. In this embodiment, the process also preferably includes slowing the flow of the aerated neutral mine drainage, preferably for a fixed period, to permit the precipitated particles in the neutral mine drainage to settle out of and separate from the neutral mine drainage as a sludge to obtain a treated neutral mine drainage. In this embodiment, the process also preferably includes separating the treated neutral mine drainage from the sludge to provide separated neutral mine drainage, and preferably storing the separated neutral mine drainage. In this embodiment, the process also preferably includes adding an alkaline aqueous solution of an alkali metal borohydride to the separated neutral mine drainage to raise the pH of the separated neutral mine drainage and to permit the precipitated particles in the separated neutral mine drainage to settle out of and separate from the separated neutral mine drainage as a sludge and to form finally treated neutral mine drainage, and preferably separating the finally treated neutral mine drainage from the sludge to form finally separated neutral mine drainage.

In this embodiment, preferably the alkali metal borohydride is added at a ratio of from about 0.5 ppm to about 2.0 ppm of alkali metal borohydride to the further separated neutral mine drainage, and more preferably at a ratio of from about 1 ppm to about 1.5 ppm.

DETAILED DESCRIPTION

Figure 1:
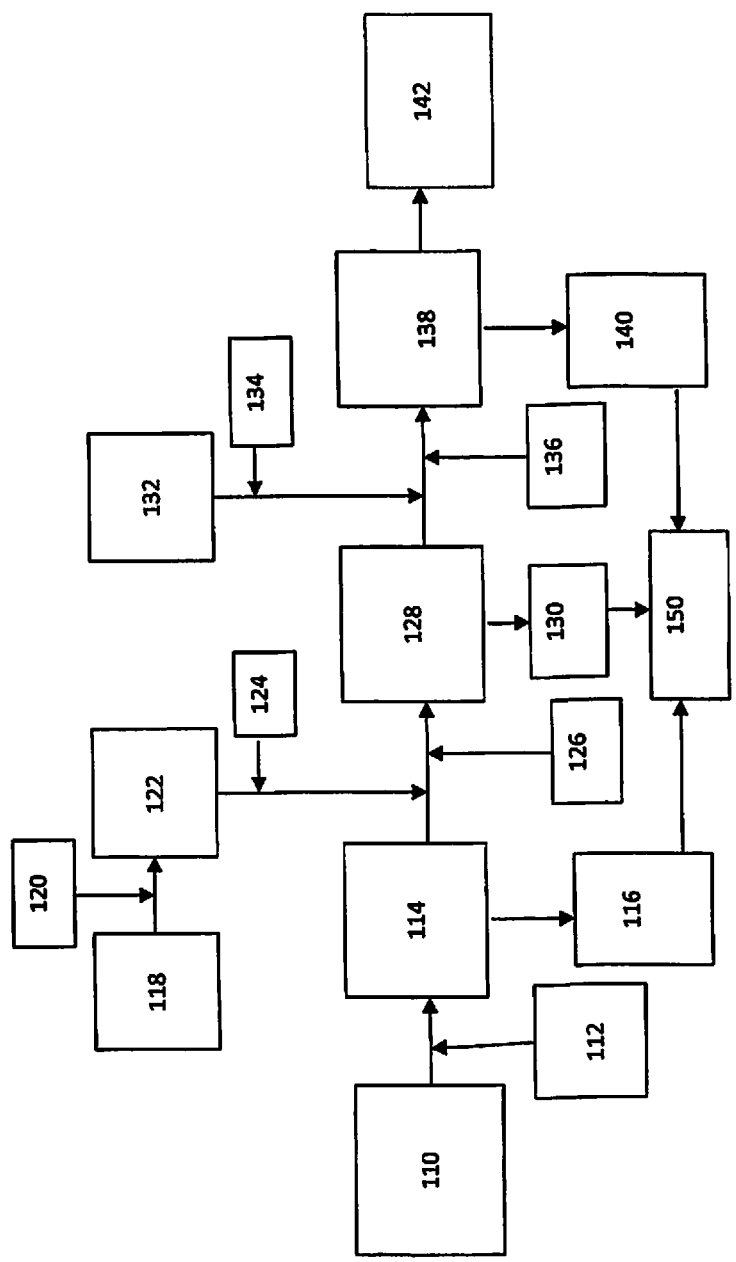
FIG. 1 is a schematic diagram illustrating a first presently preferred embodiment of the the process of the present invention.

The present process includes supplying raw mine drainage to a treatment system. The raw mine drainage, which is frequently acidic, can be provided to the treatment system employed to carry out the process through a channel open to the atmosphere. In this case, the acid mine drainage is aerated by turbulent flow through the channel as the mine drainage mixes with the atmosphere. In addition, or alternatively, the raw mine drainage can be delivered to a first pond or settling tank open to the atmosphere to permit atmospheric aeration of the raw acid mine drainage. The flow of the mine discharge is slowed by its residence in the pond or settling tank, in comparison with the flow rate into and out of the pond or tank.

In many cases, chemical consumption is a significant cost in operating an acid mine drainage treatment process. Thus, it is important that chemical usage be optimized. Atmospheric aeration is a cost effective and environmentally friendly step that can remove a portion of the easily oxidized soluble iron. In this step, oxygen reacts with iron dissolved in the acid mine drainage to change the oxidation state of the iron from ferrous (soluble) to ferric (non-soluble) iron. The ferric ion reacts with counter-ions in the acid mine drainage to form a solid ferric iron precipitate which settles quickly out of the acid mine drainage to form a sludge. Thus, atmospheric aeration can provide a first liquid/solids separation step of the present treatment process. As a result of the precipitation of the ferric iron, the pH of the AMD water will rise slightly.

With continuous flow, the sludge formed in this step is preferably removed to a sludge densification tank while the AMD water stream proceeds to the next treatment step.

There are two chemical additions that are incorporated in the present treatment process. First, slaked lime (calcium hydroxide) is added to the AMD water stream leaving the first settling tank or pond and being supplied to a second settling tank or pond. The second chemical added is preferably a dilute (low concentration) aqueous solution of sodium hydroxide and sodium borohydride which is added to the AMD water stream exiting the second settling tank or pond and being supplied to a third settling tank or pond.

Slaked lime (calcium hydroxide) is preferably added to the AMD water stream until a pH of about 7.0 is reached. In this step, a large portion of remaining metal ions in the AMD water stream will precipitate as hydroxides. Preferably, sludge is removed from the second settling tank or pond and transferred to the sludge densification tank. The remaining AMD water stream is then preferably transferred to a third settling tank (or pond). The remaining AMD water stream may still contain remaining iron and manganese ions above discharge limitations along with other metals ions.

At this point an effective amount of sodium hydroxide/sodium borohydride solution (such as 1-1.5 ppm by weight) is preferably added to the remaining AMD water stream to remove remaining soluble metals ions in the remaining AMD water stream. Preferably, the remaining AMD water stream reaches a pH of from about 8.5 to 9.0.

The desired amount of sodium borohydride depends on the concentration of iron and/or manganese in the raw AMD water stream. Thus, the process of the present invention also preferably includes assaying the raw AMD water stream and preparing an aqueous sodium hydroxide/sodium borohydride solution effective to precipitate at least 50 percent by weight of the ferrous iron ion and/or manganese ion at a pH of about 8.5 to 9.0, more preferably, at least 70 percent by weight, and still more preferably, at least 90 percent by weight.

Mine drainage water is not always acidic. In another embodiment, the present process is adapted to treat neutral mine drainage, that is water that contains a fairly neutral pH, but also contains a high amount of heavy metals and other dissolved solids. These heavy metals and other dissolved solids are preferably removed in order to meet regulatory requirements. In the absence of acidic water, the use of slake lime is often not necessary to settle out the iron. In these cases, an aeration step followed by hydroxide/hydride solution treatment will efficiently remove metal ions while minimizing sludge volumes.

A first embodiment of the process of the present invention is schematically illustrated in FIG. 1.

A raw mine drainage water stream 110 is provided for treatment. The raw mine discharge water stream frequently has a pH is below 7.0, and thus is characterized as acid mine drainage or "AMD." Atmospheric aeration 112 is cost effective and environmentally friendly, which helps to precipitate some iron, and at the same time, the pH of the water rises. The atmospheric aeration can occur in a first settling tank 114 (or pond), or during transport of the mine drainage from a point source (e.g. a mine) through a channel network to the first settling tank. Sludge 116 will settle at the bottom of the first settling tank 116.

Calcium oxide 118 (quick lime) is stored for use in the process, and water 120 is added to the calcium oxide (quick lime). The calcium oxide (quick lime) dissolves in the water to form highly water soluble calcium hydroxide 122 (slaked lime), resulting in a high concentration of slaked lime. The slaked lime is added with excess water 124 and with atmospheric aeration 126 into the AMD water stream flowing to a second settling tank 128. Sufficient slaked lime is added to provide a pH around 7. Thus the pH of the AMD water stream in the second settling tank is controlled by the addition of diluted slake lime.

Alkaline sodium borohydride solution 132 is introduced with an excess amount of water 134 as the AMD water stream in the second settling tank 128 flows to a third settling tank 138 with mixing. The final pH of the AMD water steam in the third settling tank (or pond), is around 9.0, controlled by the addition of alkaline sodium borohydride solution.

Sludge is transferred to a sludge densification tank 150.

The finally treated AMD water stream 142 is discharged to a surface water stream.

Figure 2:
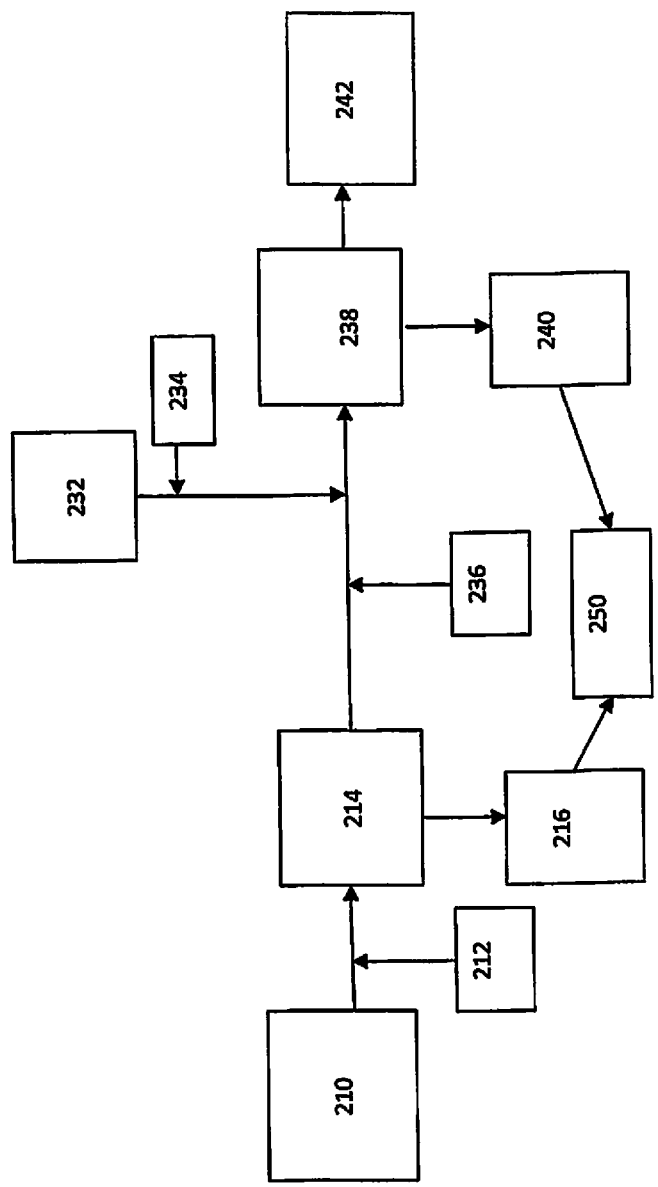
FIG. 2 is a schematic diagram illustrating a second presently preferred embodiment of the process of the present invention.

A second embodiment of the process of the present invention is schematically illustrated in FIG. 2.

A raw mine drainage water stream 210 is provided for treatment. The raw mine drainage water stream will sometime have a pH of about 7, and thus is characterized as neutral mine drainage or "NMD." Atmospheric aeration 212 is cost effective and environmentally friendly helps to precipitate some iron. The atmospheric aeration can occur in a first settling tank 214 (or pond), or during transport of the mine drainage from a point source (e.g. a mine) through a channel network to the first settling tank. Sludge 216 will settle at the bottom of the first settling tank 214.

Slaked lime need not be employed in this embodiment of the process of the present invention.

Alkaline sodium borohydrid solution 232 is introduced with an excess amount of water 234 as the NMD water stream in the first settling tank 214 flows to a second settling tank 238 with mixing. The final pH of the NMD water steam in the third settling tank (or pond), is around 9.0, controlled by the addition of alkaline sodium borohydride solution.

Sludge is transferred to a sludge densification tank 250.

The finally treated NMD water stream 242 is discharged to a surface water stream.

This process of the present invention improved treatment system significantly improves metals removal while reducing sludge 20-30% compared to the quick lime-only method.

EXAMPLE

Acid mine drainage containing iron at a concentration of 150-250 ppm and manganese at a concentration of 5-12 ppm was treated using the process of present invention. Testing the effluent from the process showed reductions above 98 percent for both metals.

Various modifications can be made in the details of the various embodiments of the process of the present invention, all within the scope and spirit of the invention and defined by the appended claims.

The invention claimed is:

1. A process for treating acid mine drainage, the process comprising:
    a) providing raw aqueous acid mine drainage having a pH;
    b) aerating the raw acid mine drainage to raise the pH and form solid particles as precipitates suspended in the acid mine drainage;
    c) slowing the flow of the aerated acid mine drainage to permit the precipitate particles in the acid mine drainage to settle out of and separate from the acid mine drainage as a sludge to obtain a treated acid mine drainage;
    d) separating the treated acid mine drainage from the sludge to provide separated acid mine drainage;
    e) slowing the flow of the separated acid mine drainage;
    f) adding slaked lime to the separated acid mine drainage to further raise the pH of the separated acid mine drainage and to permit the precipitate particles in the separated acid mine drainage to settle out of and separate from the separated acid mine drainage as a sludge and to form further treated acid mine drainage;
    g) separating the further treated acid mine drainage from the sludge to provide further separated acid mine drainage;
    h) slowing the flow of the further separated acid mine drainage;
    i) adding an aqueous solution of an alkali metal borohydride to the further separated acid mine drainage to further raise the pH of the further separated acid mine drainage and to permit the agglomerated particles in the further separated acid mine drainage to settle out of and separate from the separated acid mine drainage as a sludge and to form finally treated acid mine drainage;
    j) separating the finally treated acid mine drainage from the sludge to form finally separated acid mine drainage.

2. A process according to claim 1, the process further comprising aerating the separated acid mine drainage.

3. A process according to claim 1, the process further comprising aerating the further separated acid mine drainage.

4. A process according to claim 1 wherein the alkali metal borohydride is sodium borohydride.

5. A process according to claim 1 wherein the alkali metal borohydride is added at a ratio of from about 0.5 ppm to about 2.0 ppm of alkali metal borohydride to the further separated acid mine drainage.

6. A process according to claim 4 wherein the alkali metal borohydride is added at a ratio of from about 1 ppm to about 1.5 ppm.

7. A process according to claim 1 further comprising discharging the finally separated acid mine drainage to a surface water stream.

8. A process according to claim 1 further comprising slaking calcium oxide to prepare slaked lime.

9. A process according to claim 1 further comprising creating a turbulent flow in the acid mine drainage to aerate the acid mine drainage.

10. A process according to claim 1 wherein the flow of the aerated acid mine drainage is slowed in a first pond.

11. A process according to claim 1 wherein the flow of the separated acid mine drainage is slowed in a second pond.

12. A process according to claim 1 wherein the flow of the further separated acid mine drainage is slowed in a third pond.

13. A process according to claim 1 wherein the flow of the aerated acid mine drainage is slowed in a first settling tank.

14. A process according to claim 1 wherein the flow of the separated acid mine drainage is slowed in a second settling tank.

15. A process according to claim 1 wherein the flow of the further separated acid mine drainage is slowed in a third settling tank.

16. A process according to claim 1 wherein the alkali metal borohydride is added to the further separated acid mine drainage in an amount effective to reduce the amount of sludge produced in step i) such that the total amount of sludge produced in steps c), f) and i) is reduced by at least 10 percent by weight.

17. A process according to claim 16 wherein the alkali metal borohydride is added to the further separated acid mine drainage in an amount effective to reduce the total amount of sludge produced in steps c), f) and i) by at least 20 percent by weight.

18. A process according to claim 1 further comprising transferring sludge generated in any of process steps d), g) and j) to a sludge densification tank.

\* \* \* \* \*